No. 747,242. PATENTED DEC. 15, 1903.
F. SCHUETTE, G. FLEISCHER & W. S. THELLMAN.
HOSE COUPLING.
APPLICATION FILED SEPT. 8, 1903.

Witnesses,

Inventors.
F. Schuette.
G. Fleischer.
W. S. Thellman.
By
Attorneys.

No. 747,242. Patented December 15, 1903.

UNITED STATES PATENT OFFICE.

FREDERICK SCHUETTE, GEORGE FLEISCHER, AND WILLIAM S. THELLMAN, OF HOMESTEAD, PENNSYLVANIA.

HOSE-COUPLING.

SPECIFICATION forming part of Letters Patent No. 747,242, dated December 15, 1903.

Application filed September 8, 1903. Serial No. 172,359. (No model.)

*To all whom it may concern:*

Be it known that we, FREDERICK SCHUETTE, GEORGE FLEISCHER, and WILLIAM S. THELLMAN, citizens of the United States of America, residing at Homestead, in the county of Allegheny and State of Pennsylvania, have invented certain new and useful Improvements in Hose-Couplings, of which the following is a specification, reference being had therein to the accompanying drawings.

This invention relates to certain new and useful improvements in hose-couplings; and the object of the invention is to provide means for quickly and effectively joining two sections of hose together in such a manner as to obtain a perfectly water-tight joint but permit of the quick uncoupling of the sections when desired.

Briefly described, the invention comprises two sections or members having specially-constructed matching ends, and each section or member carries a sleeve which is movable longitudinally on the sections or members to bring the same into position over the joint between the two sections or members after the latter have been matched together. Means is carried by each of these sleeves for engagement with the sections or members to hold the sleeves in the desired positions.

The above details, together with others entering into our invention, will be hereinafter more specifically described and then particularly pointed out in the accompanying claims, and in describing the invention in detail reference will be had to the accompanying drawings, forming a part of this application, and wherein like numerals will be employed for indicating like parts throughout the different views, in which—

Figure 1:
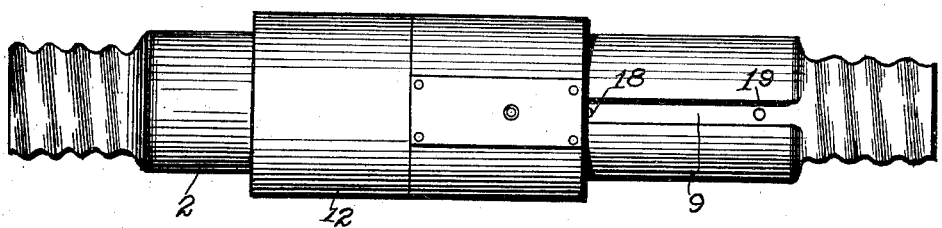
Figure 2:
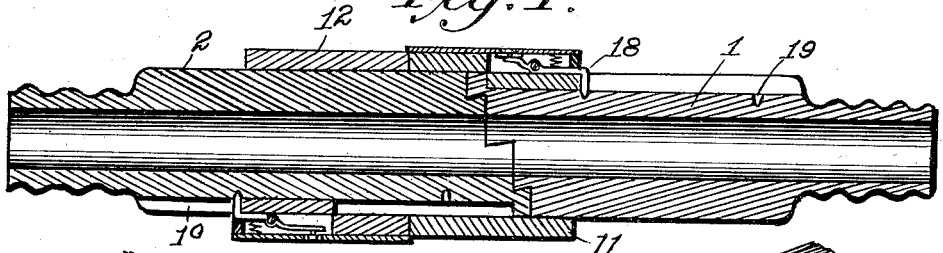
Figures 3, 4:
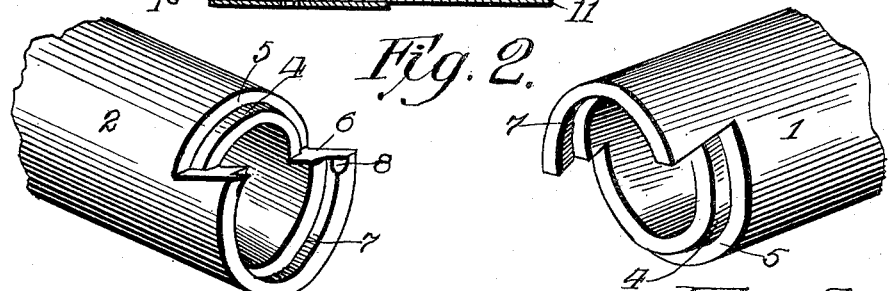
Figure 5:
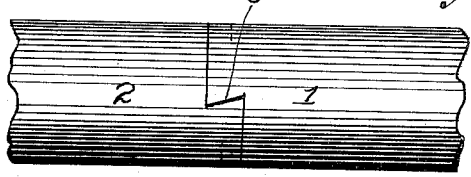
Figure 6:
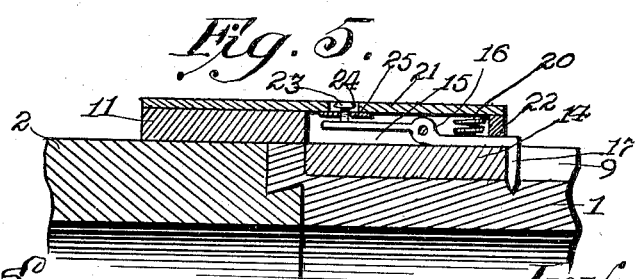

Figure 1 is a top plan view of the two sections or members matched together with the sleeves in the coupling position. Fig. 2 is a longitudinal sectional view of the members coupled together, showing the sleeves in the coupling position. Fig. 3 is a detail perspective view of a part of one of the members or sections. Fig. 4 is a like view of the other section or member. Fig. 5 is a side elevation of a part of the sections or members in the coupled position, and Fig. 6 is an enlarged longitudinal sectional view of a part of one of the sections or members and one of the sleeves.

To put our invention into practice, we provide two sections or members 1 and 2, respectively, each of which is provided with corrugated ends 3 to secure the hose (not shown) thereto, or the said hose may be secured to the sections or members in any desired manner. The ends of these sections are cut so as to match together, and when so matched and the surrounding sleeve placed in position over the joint the sections or members are prevented from pulling apart by reason of the incline formed on the matching ends. To accomplish this, the ends of the sections or members have reverse cuts—that is, the one section is cut away on one side at its end and the other section or member is cut away at the opposite side at its end—whereby to effect the matching. Each section or member is provided near its end with a semicircular shoulder 4, the walls at the rear of the shoulder extending beyond the central longitudinal line of the section or member, as will be observed clearly by reference to Fig. 5. The cut that is made lengthwise of the sections or members is at an angle, as also clearly seen in Fig. 5, the faces 6 thus produced on the different sections or members matching together, while the overhanging semicircular flange 7 of the sections is adapted to engage on the shoulder 4 of the opposite or matching section. As the cut is made past the central longitudinal line of the sections or members, it will require the overhanging flange 7 to be cut away at its ends slightly, as seen at 8, in order to permit the perfect engagement of the sections or members. The shoulder 4 on the sections or members is at an incline to the central longitudinal line of the sections or members, as clearly seen in Fig. 6. The sections or members are each provided with an exterior groove 9, the said groove in one section or member being in the reverse side thereof to the groove in the other section or member. The sections or members carry, respectively, the surrounding sleeves 11 12, each of which have an interior rib 14 to ride in the slot 10, and thus prevent rotation of the sleeves on the sections or members, but permit longitudinal movement of said sleeves.

Each sleeve is provided in its outer face, directly over the rib, with a recess 15, in which is pivotally mounted a catch 16, the hook end 17 of which extends beyond the sleeve and is adapted to engage in seats 18 19 to hold the sleeve in the operative and inoperative positions, respectively. The provision of the rib besides holding the sleeve against rotary movement also prevents weakening of said sleeve by recessing. The hook end of the catch is held normally in engagement with one of the seats by means of a spring 20, arranged between the catch and the cover-plate 21, which covers up the recess in the sleeve. A button 23, carried by this catch near its free end, lies normally within an opening 24 in the cover-plate, and a gasket 25, arranged on the shank of the button 23, prevents entrance of water from the exterior to the recess 15. At its forward end a flexible strip 22 is placed between the catch and the cover-plate, which will not interfere with the raising of the hook end of the catch, but will keep out water from entering the recess at the end. It is to be observed that only one of the sleeves is required to cover the joint between the two sections or members; but we prefer to provide a sleeve on each section or member, so that either one or the other may be employed. When one sleeve is in the retracted position and the other sleeve in position over the joint, the two sleeves will abut, the hook of the retracted sleeve being engaged in notch or seat 19 of its section or member, and the hook end of the sleeve over the joint being engaged in the seat 18 of its section or member, so as to hold this sleeve in position over the joint.

In operation the two sections or members are matched together and then either sleeve 11 or sleeve 12 moved over from its retracted position into position over the joint, and the engagement of catch end 17 in seat 18 secures said sleeve and holds it in this position. The sections cannot separate by reason on the incline cut on the matching ends, and longitudinal movement being prevented by reason that the sections would have to spread at the matched ends in order to separate, and such spreading is prevented by the surrounding sleeve. We desire to call particular attention to the fact that both the shoulder 4, the inclined walls 6, and the flanges 7 are cut at an incline to the horizontal line, and the provision of the shoulder 4 forms a double seat at the joint, effectually preventing the passage of water and making the joint practically air-tight. The shifting of the sleeve from over its position over the joint permits the disconnecting of the sections or members, as will be readily apparent.

While we have herein shown and described the invention in detail as it has been practiced by us, yet it will be observed that various slight changes may be made in the details of construction without departing from the general spirit of the invention.

Having fully described our invention, what we claim as new, and desire to secure by Letters Patent, is—

1. A hose-coupling comprising two sections or members provided with double seats at an incline to the longitudinal line of the members, each member having a semicircular shoulder, and an overhanging semicular flange, the shoulder of one of the members engaging the overhanging flange of the other member, the overhanging flange of the first-named member engaging the shoulder of the second member, said members having longitudinal grooves formed therein, the grooves of one member lying opposite to the grooves of the other member, and a sleeve mounted slidingly on said members and carrying ribs extending into the grooves of said members, with locking means carried by the said sleeve, the bottom wall formed by the said grooves of the members having seats therein in which said locking means engage.

2. A hose-coupling comprising two members having matching ends provided with double seats, said seats being at an incline to the longitudinal line of the members, each of said members having a groove formed therein, a sleeve carrying inwardly-extending ribs for engagement with said grooves, said sleeve being slidingly mounted on said members, the bottom walls of the members formed by said grooves having seats therein, and locking means carried by the members extending into said grooves and adapted to engage in said seats thereof.

In testimony whereof we affix our signatures in the presence of two witnesses.

FREDERICK SCHUETTE.
GEORGE FLEISCHER.
WILLIAM S. THELLMAN.

Witnesses:
H. C. EVERT,
A. M. WILSON.